United States Patent
Beechem, III et al.

(10) Patent No.: US 10,877,194 B2
(45) Date of Patent: Dec. 29, 2020

(54) TUNABLE GRAPHENE-BASED INFRARED REFLECTANCE FILTER HAVING PATTERNED NANOANTENNA LAYER AND UNPATTERNED GRAPHENE LAYER

(71) Applicant: National Technology & Engineering Solutions of Sandia, LLC, Albuquerque, NM (US)

(72) Inventors: Thomas Edwin Beechem, III, Albuquerque, NM (US); Michael Goldflam, Albuquerque, NM (US); Stephen W. Howell, Albuquerque, NM (US); David W. Peters, Albuquerque, NM (US); Isaac Ruiz, Albuquerque, NM (US); Paul Davids, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 447 days.

(21) Appl. No.: 15/872,293

(22) Filed: Jan. 16, 2018

(65) Prior Publication Data
US 2019/0219747 A1 Jul. 18, 2019

(51) Int. Cl.
*G02B 1/04* (2006.01)
*G02B 5/20* (2006.01)
(Continued)

(52) U.S. Cl.
CPC ............ *G02B 5/208* (2013.01); *G01N 21/17* (2013.01); *G02B 1/04* (2013.01); *G02B 5/008* (2013.01);
(Continued)

(58) Field of Classification Search
CPC .......... G02B 5/008; G02B 5/26; G02B 5/265; G02B 5/281; G02B 5/282; G02F 2203/10; G01N 21/553; G01N 21/554
See application file for complete search history.

(56) References Cited

U.S. PATENT DOCUMENTS

| | | | |
|---|---|---|---|
| 2014/0023321 A1* | 1/2014 | Lu .................... | B82Y 10/00 385/40 |
| 2015/0168747 A1* | 6/2015 | Kadono ............. | G02F 1/13439 348/360 |

(Continued)

OTHER PUBLICATIONS

Brar, V.W., "Highly Confined Tunable Mid-Infrared Plasmonics in Graphene Nanoresonators", Nano Lett. (2013), vol. 13, pp. 2541-2547.

(Continued)

*Primary Examiner* — Ryan S Dunning
(74) *Attorney, Agent, or Firm* — Kevin W. Bieg

(57) ABSTRACT

An actively tunable optical filter can control the amplitude of reflected infrared light. The filter exploits the dependence of the excitation energy of plasmons in a continuous and unpatterned sheet of graphene, on the Fermi-level, which can be controlled by conventional electrostatic gating. An exemplary filter enables simultaneous modification of two distinct spectral bands whose positions are dictated by the device geometry and graphene plasmon dispersion. Within these bands, the reflected amplitude can be varied by over 15% and resonance positions can be shifted by over 90 cm$^{-1}$. Electromagnetic simulations verify that tuning arises through coupling of incident light to graphene plasmons by a nanoantenna grating structure. Importantly, the tunable range is determined by a combination of graphene properties, device structure, and the surrounding dielectrics, which dictate the plasmon dispersion. Thus, the underlying design is applicable across a broad range of infrared frequencies.

24 Claims, 7 Drawing Sheets

(51) Int. Cl.
*G02B 5/26* (2006.01)
*G01N 21/17* (2006.01)
*G02B 5/00* (2006.01)
*B82Y 20/00* (2011.01)
*G02F 1/00* (2006.01)
*G01N 21/552* (2014.01)

(52) U.S. Cl.
CPC .............. *G02B 5/204* (2013.01); *G02B 5/26* (2013.01); *B82Y 20/00* (2013.01); *G01N 21/553* (2013.01); *G01N 21/554* (2013.01); *G02F 1/00* (2013.01); *G02F 2203/10* (2013.01)

(56) References Cited

U.S. PATENT DOCUMENTS

2017/0097451 A1* 4/2017 Kyoung .................. G02B 5/285
2018/0004061 A1* 1/2018 Sommer ............... G02F 1/0018

OTHER PUBLICATIONS

Brar, V.W., "Hybrid Surface-Phonon-Plasmon Polariton Modes in Graphene/Monolayer h-BN Heterostructures", Nano Lett., vol. 14 (2014), pp. 3876-3880.
Chen, J., "Optical nano-imaging of gate-tunable graphene plasmons", Nature, vol. 487 (2012), pp. 77-81.
Fang, Z., "Gated Tunability and Hybridization of Localized Plasmons in Nanostructured Graphene", ACS Nano, vol. 7 (2013), pp. 2388-2395.
Jadidi, M.M., "Tunable Terahertz Hybrid Metal-Graphene Plasmons", Nano Lett., vol. 15 (2015), pp. 7099-7104.

* cited by examiner

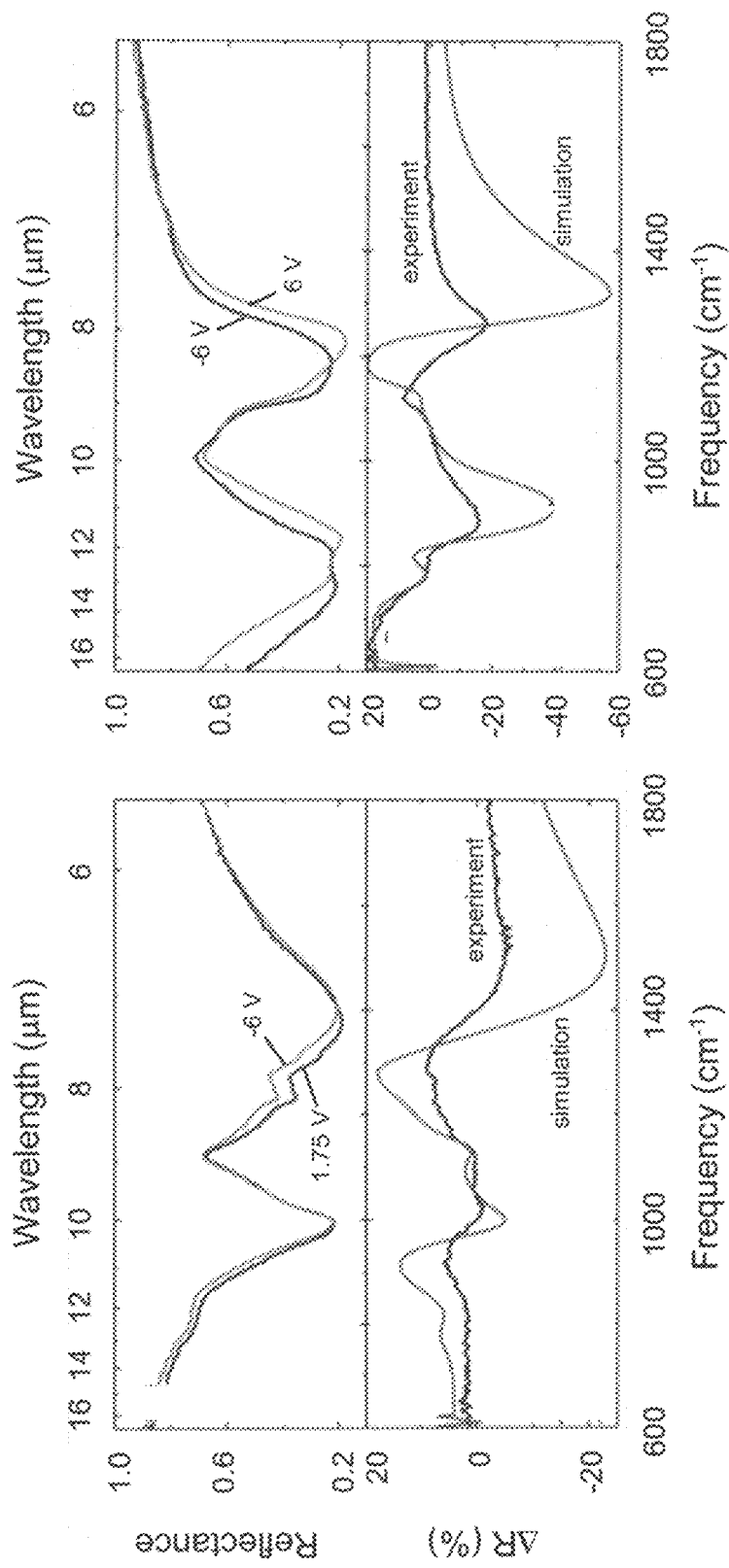

US 10,877,194 B2

TUNABLE GRAPHENE-BASED INFRARED REFLECTANCE FILTER HAVING PATTERNED NANOANTENNA LAYER AND UNPATTERNED GRAPHENE LAYER

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to optical filters and, in particular, to a tunable graphene-based infrared reflectance filter.

BACKGROUND OF THE INVENTION

Active solid-state optical filtering presents exciting prospects for integration with a range of technologies including infrared detectors. Presently, frequency selective components often take the form of bulky filter wheels that are placed in front of a detector and rotated for spectral selectivity. However, these filter wheels require mechanical motion making them non-ideal for many high-performance situations. To circumvent this limitation, solid-state filtering has been widely pursued from visible to terahertz frequencies employing both electric-field and thermally tunable materials. See Y. W. Huang et al., *Nano Lett.* 16, 5319 (2016); J. Park et al., *Sci. Rep.* 5, 15754 (2015); T. Driscoll et al., *Appl. Phys. Lett.* 93, 024101 (2008); M. D. Goldflam et al., *Appl. Phys. Lett.* 105, 041117 (2014); M. J. Dicken et al., *Opt. Express* 17, 18330 (2009); T. B. Hoang and M. H. Mikkelsen, *Appl. Phys. Lett.* 108, 183107 (2016); and D. Shrekenhamer et al., *Phys. Rev. Lett.* 110, 177403 (2013).

Graphene has risen to the forefront of the electrically-tunable options due to its small footprint and the ease with which its optical response can be modified through carrier injection. See M. S. Jang et al., *Phys. Rev. B* 90, 165409 (2014); Z. Fang et al., *ACS Nano* 7, 2388 (2013); and V. W. Brar et al., *Nano Lett.* 13, 2541 (2013). While graphene is only one atom thick, its interaction with infrared light can be enhanced by plasmonic excitation enabling graphene to significantly influence the optical response of a microns-thick material stack. Importantly, the plasmonic dispersion of graphene is determined by both its surrounding dielectric environment, as well as graphene's free carrier density. Changes to the Fermi level cause shifts in the plasmon dispersion, thereby modifying the excitation energies of plasmons at a given momentum. See Z. Fei et al., *Nature* 487, 82 (2012); Z. Fei et al., *Nano Lett.* 15, 8271 (2015); A. Woessner et al., *Nat. Mater.* 14, 421 (2015); M. D. Goldflam et al., *Nano Lett.* 15, 4859 (2015); and M. Jablan et al., *Phys. Rev. B* 80, 245435 (2009).

Exploitation of this tunable response requires plasmonic excitation. This process is not trivial as the plasmon dispersion lies at momenta far greater than that of free-space light, necessitating a mechanism for excitation of evanescent high-momentum fields near the graphene. Previous studies have employed a range of patterned or sharp metallic features, as well as direct patterning of the graphene to provide the required momentum. See Z. Fang et al., *ACS Nano* 7, 2388 (2013); V. W. Brar et al., *Nano Lett.* 13, 2541 (2013); J. Chen et al., *Nature* 487, 77 (2012); V. W. Brar et al., *Nano Lett.* 14, 3876 (2014); and M. M. Jadidi et al., *Nano Lett.* 15, 7099 (2015). However, contact between metals and graphene has been shown to induce Fermi level (EF) pinning. Graphene patterning, meanwhile, both complicates fabrication and can also result in residual photoresist on the graphene surface. See T. Mueller et al., *Phys. Rev. B* 79, 245430 (2009); and C. Casiraghi et al., *Appl. Phys. Lett.* 91, 233108 (2007). Both effects can greatly limit the range over which the graphene Fermi level can be modified, which, in turn, limits the tuning range of filters based on this effect.

SUMMARY OF THE INVENTION

The present invention is directed to a tunable graphene-based infrared reflectance filter, comprising a substrate; a bottom dielectric layer on the substrate; a graphene layer on the bottom dielectric layer; a top dielectric layer on the graphene layer; and a nanoantenna layer on the top dielectric layer, wherein the nanoantenna layer is patterned to excite plasmons within the graphene layer. The nanoantenna layer can be a conductive nanoantenna that is adapted to apply a voltage bias to the graphene layer, thereby changing the Fermi level of the graphene and tuning the resonance response of the filter to incident infrared light. Alternatively, or in addition, the substrate can be a conductive substrate that can provide a backgate. The conductive substrate can comprise degenerately doped silicon or a metal. For example, the top and bottom dielectric layers can comprise silicon dioxide, hafnium dioxide, magnesium oxide, lead zirconium titanate, alumina, or other non-conductive dielectric material. For example, the nanoantenna can comprise a metal grating. The wavelength of the incident infrared light can be between 1 microns and 50 microns and, more preferably, can be long wavelength infrared light.

BRIEF DESCRIPTION OF THE DRAWINGS

The detailed description will refer to the following drawings, wherein like elements are referred to by like numbers.

FIG. 4(c) is a graph of the measured reflectance for the first filter at voltages of smallest and largest graphene conductivity. FIG. 4(d) is a graph of the measured reflectance of the second filter at voltages of smallest and largest graphene conductivity. FIG. 4(e) is a graph of the measured and simulated differential reflectance between $V_G=1.75V$ and $-6V$ and 0.4 and 0.7eV respectively for the first filter shown in FIG. 4(c). FIG. 4(f) is a graph of the measured and simulated differential reflectance between $V_G=-6V$ and 6V and 0.4 and 0.7 eV for the second filter shown in FIG. 4(d).

FIG. 5(a) is a field map at 1053 $cm^{-1}$ (9.5 μm) and $E_F=0.4$ eV. FIG. 5(b) is a field map at 1053 $cm^{-1}$ (9.5 μm) and $E_F=0.8$ eV. FIG. 5(c) is a field map at 1250 $cm^{-1}$ (8 μm) and $E_F=0.4$ eV. FIG. 5(d) is a field map at 1250 $cm^{-1}$ (8 μm) and $E_F=0.8$ eV.

DETAILED DESCRIPTION OF THE INVENTION

The present invention is directed to a tunable graphene-based reflectance filter for infrared frequencies that avoids the deleterious effects described above. Tunability in this filter arises from excitation of plasmons within a graphene layer. In contrast to previous graphene-based tunable filters, this filter avoids patterning of the graphene itself and prevents contact between graphene and metal structures, an advantage that avoids Fermi level pinning of the graphene that limits spectral tunability.

Figure 1:
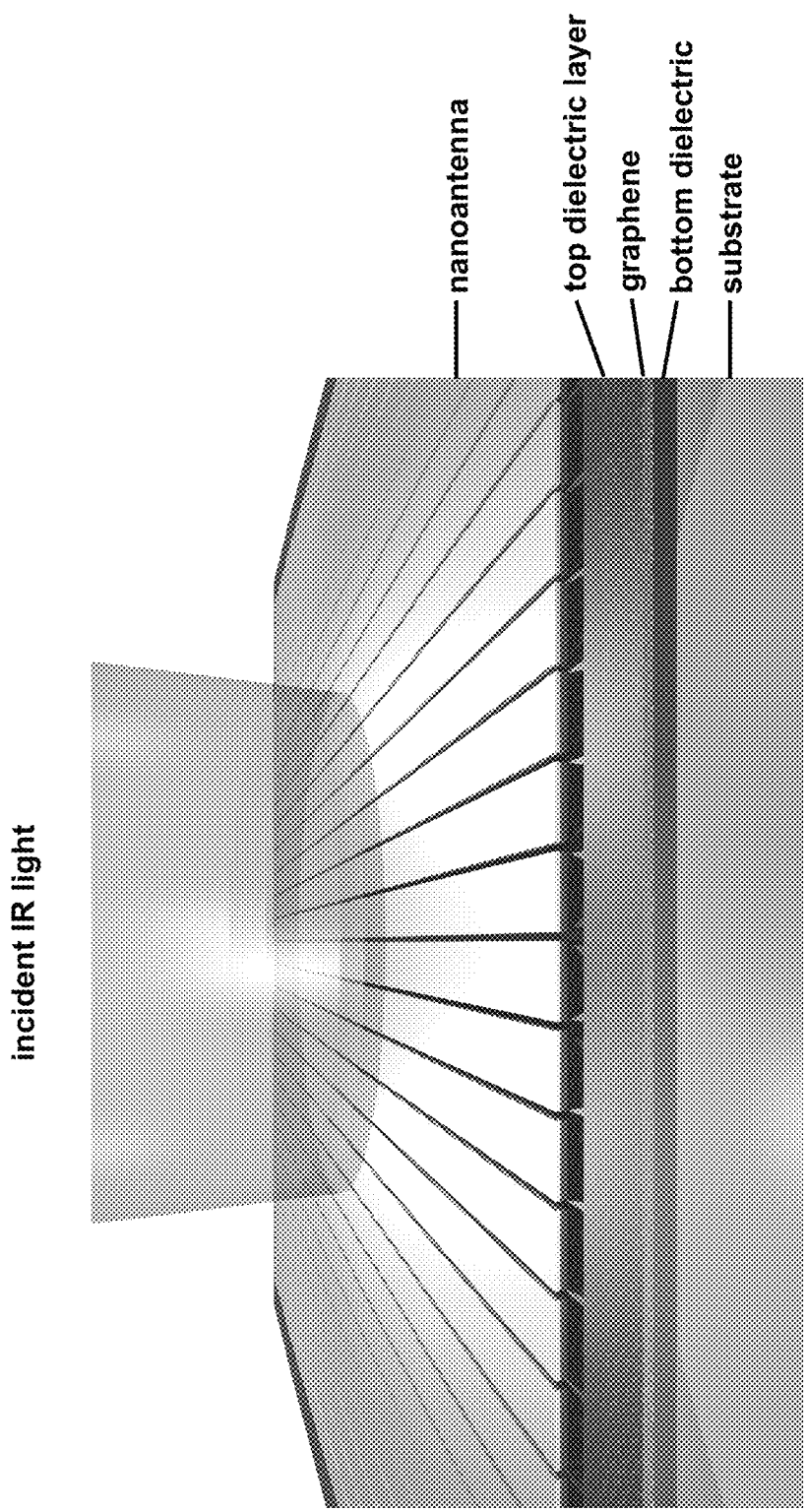
FIG. 1 is a schematic illustration of a tunable graphene-based infrared reflectance filter showing the various layers and the incident infrared beam. Graphene is present between the dielectric layers.

A schematic illustration of an exemplary filter comprising several periods of the structure is shown in FIG. 1. Depending on the details of the filter structure, the filter can generally be responsive to infrared light from about 1 to 60 microns wavelength and, more preferably, to long wavelength infrared (LWIR) light (e.g., 6 to 18 microns wavelength). The filter layers can be built on a substrate. If the substrate is electrically conductive (or has a conductive layer on an insulating substrate), the substrate can be used as a backgate. For example, the conductive substrate can be degenerately doped silicon or a metal. Other rigid or flexible substrates to which graphene can be transferred can also be used, such as silicon, glass, or polymers. The structure further comprises a graphene layer sandwiched between two dielectric layers on the substrate. For the examples described below, the sandwich comprises a silicon dioxide ($SiO_2$) bottom dielectric layer on a degenerately doped silicon substrate, transferred chemical vapor deposition-grown (CVD) graphene, and a top dielectric layer of 20nm hafnium dioxide ($HfO_2$) deposited on the graphene. Other non-conductive dielectric materials can also be used for the dielectric layers, such as magnesium oxide, lead zirconium titanate, or alumina. The presence of the capping oxide also helps to ensure the long term stability of the underlying graphene by isolating it from the environment, thereby preventing accumulation of adsorbates on the graphene over time. See J. D. Fowler et al., *ACS Nano* 3, 301 (2009); and C. W. Chen et al., *J. Vac. Sci. Technol. B* 30, 040602 (2012). Next, a nanoantenna structure can be deposited on the top dielectric layer. The nanoantenna can comprise any material and pattern that is capable of exciting plasmons in the underlying unpatterned graphene layer. For example, the nanoantenna can comprise a grating with periodicity comparable to the wavelength of the incident infrared light and, more preferably, subwavelength to the incident light. For examples described below, the nanoantenna comprises a 50nm thick gold grating patterned over the graphene area (in the examples described herein, the grating has an area of approximately 60×60 $μm^2$). Other metals or conductive non-metals, such as conductive oxides and polymers, can also be used for the nanoantenna material when the nanoantenna is adapted to provide a top gate. The nanoantenna serves multiple purposes: first, it can act as the primary gate for graphene allowing the high-κ dielectric nature of $HfO_2$ to be employed for injection of charge into the graphene; second, field enhancement within the small gaps of the nanoantenna results in increased interaction of incident light with the continuous graphene sheet; and lastly, the resonant response of the nanoantenna itself excites graphene plasmons that can dominate the overall response of the filter, as will be described below. In the exemplary structure, the $HfO_2$ dielectric serves as both a spacer layer between the graphene and gold grating to prevent Fermi level pinning and as an efficient high-κ gate dielectric for Fermi level modification when a bias voltage is applied between the nanoantenna and the graphene. If a backgate is used, bias can be applied to the graphene layer via both the nanoantenna and the conductive substrate, thereby providing a dual-gated device for greater Fermi-level tuning. Alternatively, the bias can be applied solely through the backgate and the nanoantenna can be used solely as an optical component to excite plasmons within the graphene. In that case, the nanoantenna can be a non-conductive dielectric material. Both the period of the nanoantenna grating and $SiO_2$ bottom dielectric thickness were varied in the exemplary filters described below.

Figure 2:
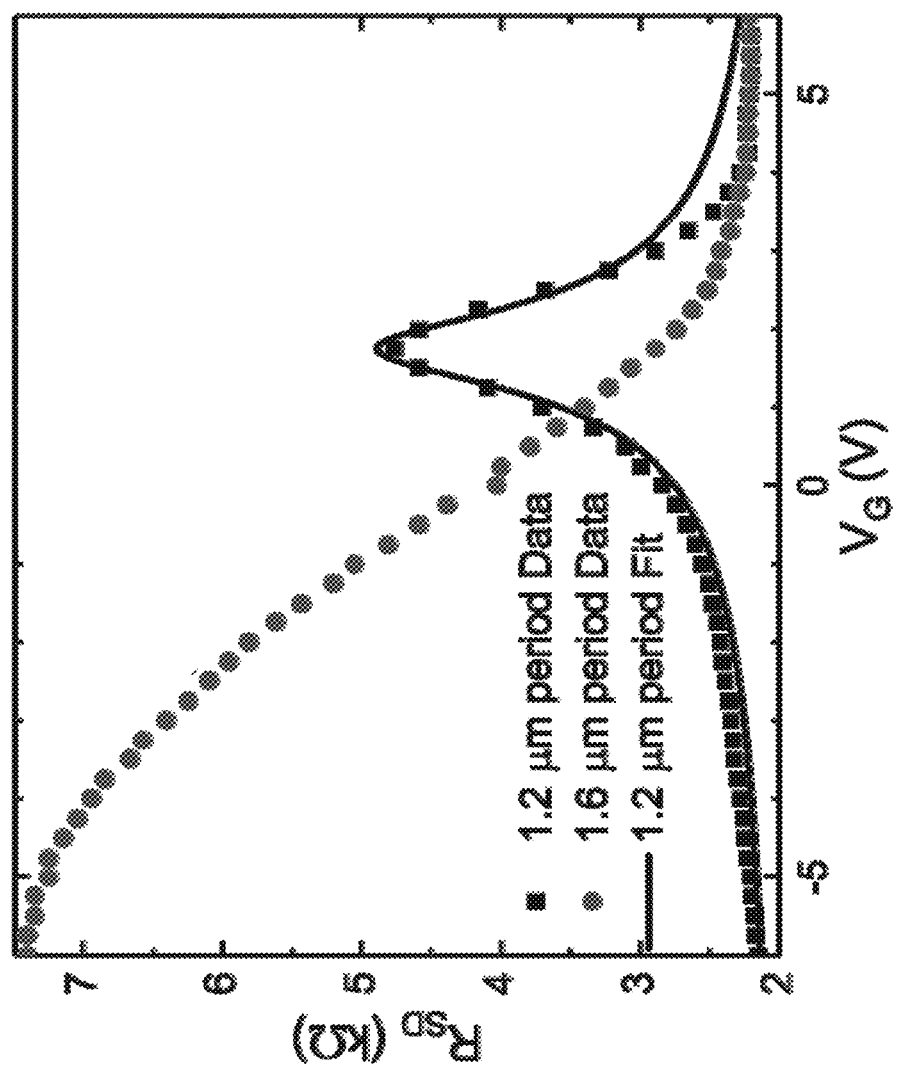
FIG. 2 is a graph of characteristic transport curves obtained from two devices during application of variable bias ($V_G$) across the $HfO_2$ dielectric with a constant source-drain voltage of 50 mV.

Characteristic gate-dependent transport curves, obtained while sweeping the bias ($V_G$) applied to the grating with a small bias applied across source and drain electrodes for measuring the graphene resistance, are shown in FIG. 2 for two different exemplary filters. The first exemplary filter has a period of 1.2 μm and an $SiO_2$ thickness of 150 nm while the second exemplary filter has a larger period of 1.6 μm and thicker 600 nm $SiO_2$. The gap in the gold grating in both cases is 100 nm wide. For brevity throughout the remainder of the description, the 1.2 μm period device is referred to as the first filter and the 1.6 μm period device as the second filter. The filters show resistance modulation consistent with gating, indicating the grating's ability to tune the carrier concentration within the graphene.

Figures 3A, 3B:
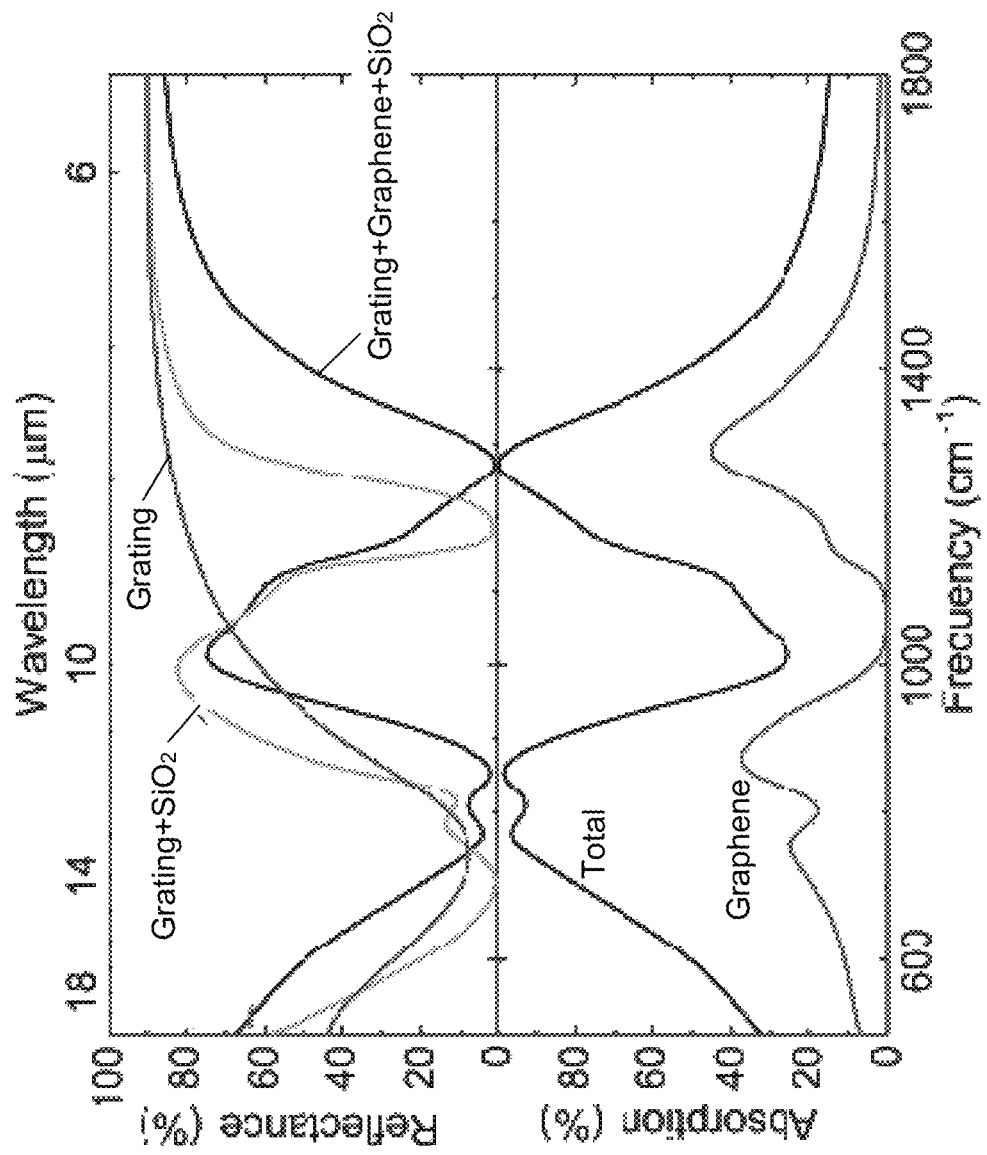
FIG. 3(a) is a graph of simulated reflectance demonstrating the effects of each additional element. The graph labeled "Grating" shows the reflectance of the grating structure in the absence of graphene and with a dispersionless (n=1.3) and lossless (k=0) dielectric in place of $SiO_2$. The graph labeled "Grating +$SiO_2$" shows the reflectance of the grating structure in the absence of graphene with realistic dielectric optical responses. The graph labeled "Grating+Graphene+$SiO_2$" shows the simulated full device response including graphene and dispersive dielectrics.
FIG. 3(b) is a graph showing a comparison of graphene absorption in the full device and the total absorption, demonstrating increased graphene absorption in bands of tunability.

The origins of the infrared response can be determined through full-wave electromagnetic simulations that assess the influence of each constituent element. For these simulations, optical properties of the oxides, silicon, and gold were determined from variable angle spectroscopic ellipsometry while graphene properties were calculated using the random phase approximation. See E. H. Hwang and S. Das Sarma, *Phys. Rev. B* 75, 205418 (2007). In the model, graphene was represented as a sheet conductance at the interface between the $SiO_2$ and $HfO_2$. See M. D. Goldflam et al., *Opt. Express* 25, 12400 (2017). Initially, a simpler structure was simulated that did not contain graphene and for which the $SiO_2$ was replaced by a nondispersive and lossless dielectric with an index of refraction of 1.3 (i.e., a material stack comprised of doped Si, a nondispersive dielectric, dispersive $HfO_2$ and the gold grating). As shown in FIG. 3(a), the spectral response of this structure is dominated by the metallic grating (curve labeled "Grating") as evidenced by the single broad resonance with a minimum at ~750 $cm^{-1}$. Changing the properties of the non-dispersive oxide to those measured for $SiO_2$ results in the appearance of three peaks at frequencies of approximately 800, 1095, and 1200 cm$^{-1}$ (curve labeled "Grating+SiO$_2$"). While the precise locations of the reflectance peaks depend on the structure (grating dimensions and oxide thicknesses), their locations roughly correlate with the frequencies of the optical phonons in SiO$_2$. Effectively, the phonon resonances hybridize with the grating mode which results in splitting of the grating resonance into two sharper minima.

With the addition of graphene to the structure (E$_F$=0.6 eV, curve labeled "Grating+Graphene+SiO$_2$"), these two minima shift to higher frequencies indicating coupling of the grating and phonon resonances to the graphene. Evidence of this coupling can be seen by examining absorption in graphene itself (curved labeled "Graphene" in FIG. 3(b)). Spectral regions of maximum absorption in graphene corresponds to minima in total reflectance (i.e. maxima in total absorption for this non-transmissive device), with absorption in the graphene layer exceeding 40%. Significant interaction of infrared light with graphene, indicative of plasmonic excitation, points towards the possibility for tunability owing to the intrinsic gate-tunability of the plasmonic dispersion.

To experimentally demonstrate plasmon-enabled tunability, reflectance spectra of fabricated filters were measured under TM-illumination using a microscope coupled to a Fourier transform infrared (FTIR) spectrometer. Maps of normalized reflectance as a function of applied gate bias for two different geometries are shown in FIGS. 4(a)-(f). The data in FIGS. 4(a), (c), and (e) correspond to the first filter while FIGS. 4(b), (d), and (f) were taken on the second filter. For both filters, two local reflection minima separated by the SiO$_2$ phonon response are observed. Importantly, the positions of the minima differ between the two filters with shifts of about 200 cm$^{-1}$ showing the effects that geometric modification can have on the response. However, post-fabrication active tuning, where the optical response can be changed independent of geometry, is required for many applications, including that of active infrared sensors.

Figures 4A, 4B:
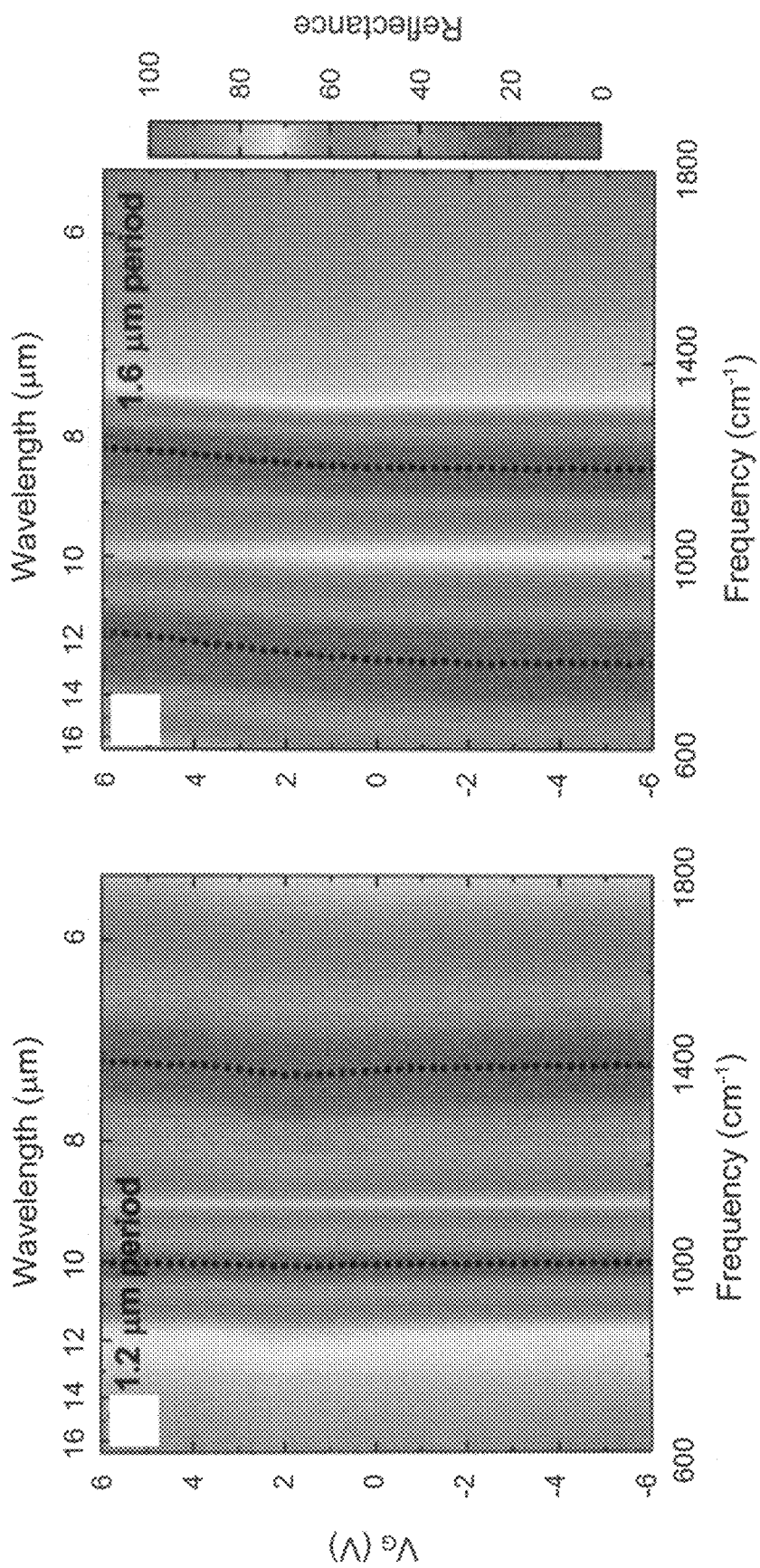
FIG. 4(a) is a graph of the measured voltage and frequency dependent reflectance map obtained from the first filter. Black dots track the minima of each resonance.
FIG. 4(b) is a graph of the experimental voltage and frequency dependent reflectance map obtained from the second filter.

To this end, the bias dependence of the collected spectra was examined. The measured spectral maps show variation in reflectance that results from gate-voltage-induced modifications of graphene's Fermi-level. For the first filter shown in FIG. 4(a), the positions of both minima blueshift as additional carriers are injected into graphene. Carriers accumulate in the graphene when |V$_G$–V$_{CNP}$|>0 where the voltage at the charge neutrality point V$_{CNP}$~1.75 V is determined from the transport data shown in FIG. 2. As is expected from transport data, shifts in the reflectance minima are nearly symmetric with applied bias, as shown by the black dots in FIG. 4(a) which map out the positions of the local minima. The maximum shift of the resonance position of the higher frequency mode near ~1400 cm$^{-1}$ is 25 cm$^{-1}$, which significantly exceeds that of the lower frequency resonance which shifts by 8 cm$^{-1}$. Differential reflectance is a convenient figure of merit for a reflectance mode filter. From the data at V$_{CNP}$ (1.75 V) and the maximally shifted data (V$_G$=–6 V) shown in FIG. 4(c), the calculated differential reflectance (ΔR=R(–6V)–R(V$_{CNP}$)) approaches 10% for the higher frequency mode, as shown in FIG. 4(e) (line labeled "experiment"). The measured and simulated differential reflectance are in relatively good agreement with the simulated data (line labeled "simulation") accurately reproducing the frequencies of the most salient spectral features.

For the second filter shown in FIGS. 4(b) and (d), sizable shifts in both resonances result from gate-voltage-induced Fermi level changes. Specifically, the high and low frequency resonance locations change by 42 cm$^{-1}$ and 91 cm$^{-1}$, respectively. Thus, the differences in geometry yield a more than tenfold increase in the spectral shift of the low frequency mode. These larger spectral shifts result in an increased differential reflectance in both measured and simulated results (ΔR=R(6V)–R(–6V)) exceeding 15% (FIG. 4(f)) at both 890 and 1260 cm$^{-1}$ in the measured data. This value of ΔR suggests that this reflective filter could be used to enable a frequency-agile infrared detector where the amplitude of reflected light can modulate the detector signal. Unlike in the first filter, this filter shows asymmetric behavior with bias as both resonance minima shift monotonically (see black dots in FIG. 4(b)). This behavior is consistent with the transport data shown in FIG. 2 (circles). Importantly, the unipolar transport behavior does not eliminate tunability. Ultimately, the size of changes in carrier concentration directly correlate with the overall performance.

With tuning established, the underlying tuning mechanism was more closely investigated through examination of the the electric field within the second filter during optical excitation. Plots of the simulated real part of the y-component of the electric field ($\Re(E_y)$) near the graphene are shown in FIGS. 5(a)-(d) for one period of the device at two different frequencies and Fermi levels. At ω=1053$^{-1}$ cm$^{-1}$, which is between the reflection minima seen in FIG. 4(b), the electric field maps are unremarkable. The field is antisymmetric with respect to the gap, and field strength (|$\Re(E_y)$|) decays monotonically with distance from the gap. Only minimal changes in this response are observed when E$_F$ is varied, as seen by the nearly identical field maps in FIGS. 5(a) and (b). This is in good agreement with the measured results in FIG. 4(f), where the reflectance stays relatively constant at this frequency as bias is applied with ΔR<0.5%.

Figures 5A, 5B, 5C, 5D:
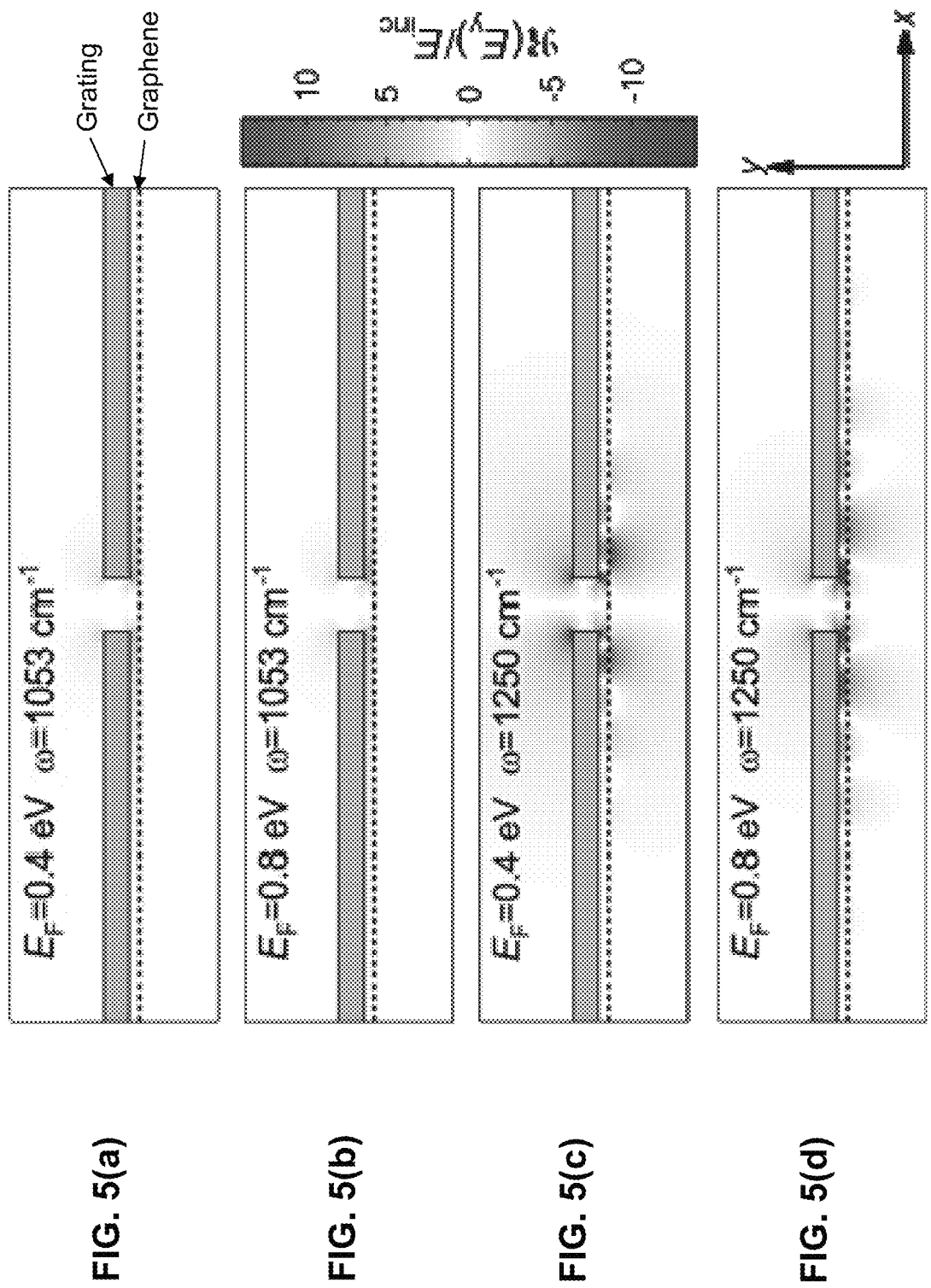
FIGS. 5(a)-5(d) are maps of the real part of the y-component of the electric field near the graphene in one period of the second filter. Rectangles represent the gold grating while the underlying black dotted line corresponds to the location of the graphene.

In stark contrast, field plots at 1250 cm$^{-1}$ (FIGS. 5(c) and (d)), where large changes to reflection are measured (ΔR>17% in FIG. 4(f)), exhibit a periodically oscillating field around the graphene that varies with Fermi level. The periodic oscillations are indicative of excitation of surface plasmon modes in the graphene, which are evanescent along the y-direction and propagate in the x-direction. See L. Novotny and B. Hecht, *Principles of nano-optics* (Cambridge university press, 2012). Important to the functionality of the device, changing the graphene Fermi level from 0.4 eV to 0.8 eV modifies the field profiles significantly with a definitive change in both the periodicity and amplitude of the oscillating maxima and minima, suggesting a change of the plasmon wavelength. In particular, significant shifts in the excitation frequency for a given plasmon momentum are present with changing E$_F$. As a result, the wavelength of the plasmon excited by a given free space wavelength is modified through changes to the graphene carrier density, resulting in the changes to the periodicity of the electric field maps shown in FIGS. 5(c) and (d). It is the coupling between the incident field and graphene plasmons that lends the filter its tunability.

This understanding of tunability arising from plasmonic excitation helps to explain the limited tuning range of the lower frequency resonance in the first filter. At frequencies between ~1000 and 1100 cm$^{-1}$, graphene plasmons cannot be excited due to mode repulsion between the graphene plasmon and the SiO$_2$ phonons. See M. D. Goldflam et al., *Opt. Express* 25, 12400 (2017); and Z. Fei et al., *Nano Lett.* 11, 4701 (2011). In the absence of plasmon excitation, tuning does not occur. In the second filter, the selected dimensions move the two resonances to frequencies away from the strongest SiO$_2$ phonons resulting in increased tuning of both minima.

Figure 6:
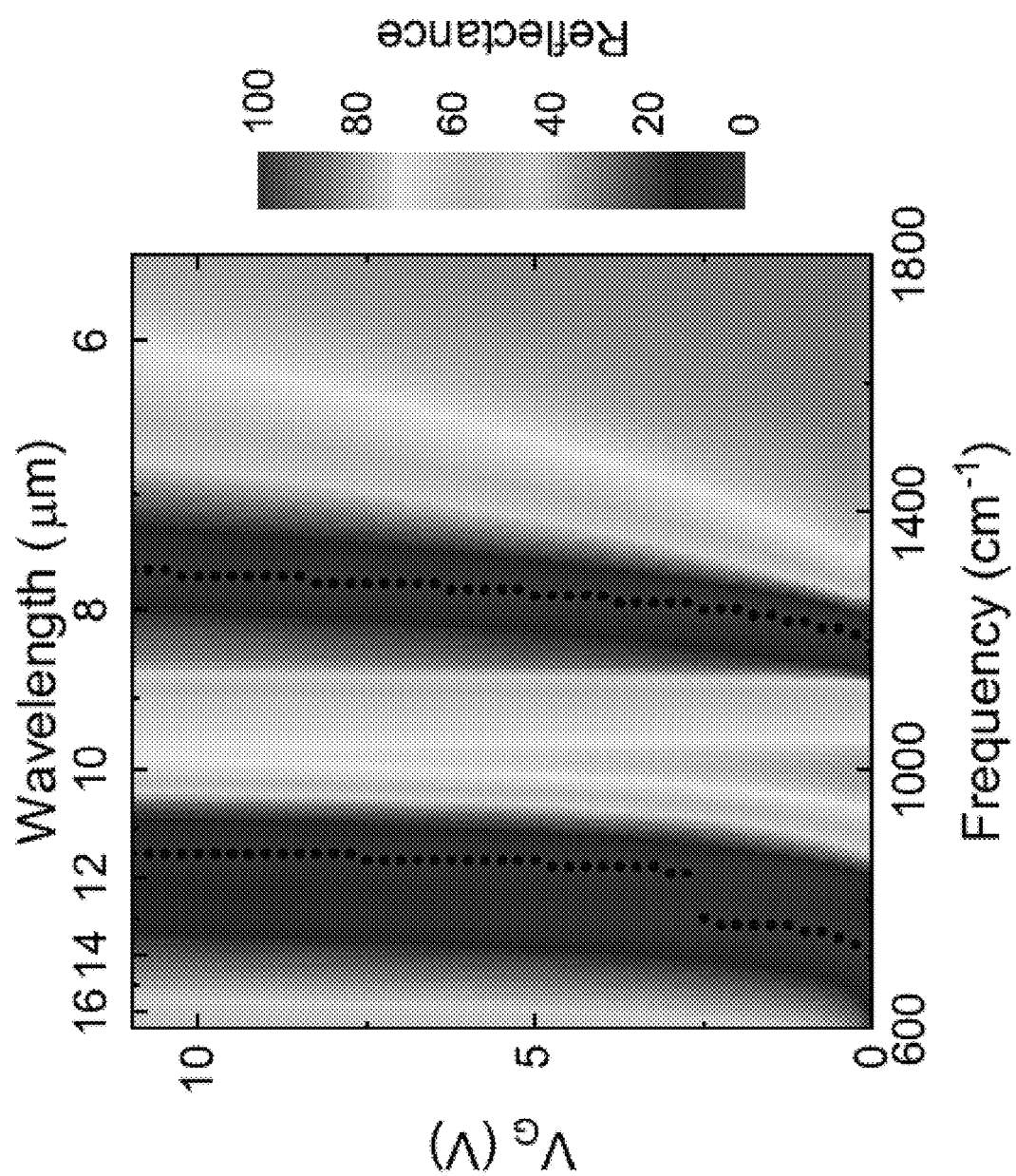
FIG. 6 is a simulated reflectance map for a filter assuming ideal behavior. Black dots track the location of minima.

Simulations of reflectance from an ideal second filter are shown in FIG. 6. These simulations assume that there are no charged impurities on the graphene ($E_F$=0 eV) and the use of a high quality HfO$_2$ gate that can be taken to its breakdown voltage. Literature values were used for both the breakdown field ($E_{BD}$~5.4 MV/cm), equivalent to 11 V applied across the 20-nm thick HfO$_2$, and the dielectric constant of HfO$_2$ (κ=20). See J. Yota et al., *J. Vac. Sci. Technol. A* 31, 01A134 (2013); and J. Robertson, *Eur. Phys. J. Appl. Phys.* 28, 265 (2004). Based on these assumptions, a filter was simulated where the graphene Fermi level can be tuned from 0 eV to 0.9 eV and where the Fermi level at a given bias is obtained from the following relationship:

$$E_F = \sqrt{\frac{\varepsilon\varepsilon_0 \hbar^2 v_F^2 \pi |V_G|}{ed}}$$

where $\varepsilon_0$ is the free space permittivity, $\hbar$ is the reduced Planck constant, $v_F$=c/300 is the Fermi velocity with speed of light c, $V_G$ is the applied gate voltage across a dielectric of thickness d, and e is the electron charge. See Z. Fei et al., *Nature* 487, 82 (2012). The change in frequencies of the reflectance minima in these simulations are 160 and 130 cm$^{-1}$ for the low and high frequency dips, respectively. Only positive bias is shown as the expression used for $E_F$ depends only on the absolute value of the voltage. These simulations indicate that improved functionality can be obtained through advances in fabrication quality.

The filters described and measured herein demonstrate graphene-based active tuning for infrared filtering. Notably, the choice of surrounding dielectrics, and the geometry itself, have a strong influence on the regions of tunability enabling filters to be designed for functionality in specific wavelength regimes. By selecting cladding dielectrics based on their phonon modes, the tuning range can be designed. Lastly, the use of unpatterned large-area graphene ensures the scalability of the design reducing the complexity inherent in fabrication. The filter can be further improved through use of higher quality graphene. The invention enables frequency agile solid-state filters than can provide hyperspectral infrared sensing without the necessity for modification of the detector itself.

The present invention has been described as a tunable graphene-based infrared reflectance filter. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A tunable graphene-based infrared reflectance filter, comprising:
   a substrate;
   a bottom dielectric layer on the substrate;
   an unpatterned graphene layer on the bottom dielectric layer;
   a top dielectric layer on the graphene layer; and
   a conductive nanoantenna layer on the top dielectric layer, wherein the conductive nanoantenna layer is patterned to excite plasmons within the graphene layer and wherein the conductive nanoantenna layer is adapted to apply a voltage bias to the graphene layer, thereby changing the Fermi level of the graphene and tuning the resonance response of the infrared reflectance filter to infrared light incident on the top surface of the conductive nanoantenna layer.

2. The tunable graphene-based infrared reflectance filter of claim 1, wherein the substrate comprises a conductive substrate, thereby providing a backgate.

3. The tunable graphene-based infrared reflectance filter of claim 2, wherein the conductive substrate comprises degenerately doped silicon or a metal.

4. The tunable graphene-based infrared reflectance filter of claim 1, wherein the substrate comprises an insulating substrate.

5. The tunable graphene-based infrared reflectance filter of claim 1, wherein the bottom dielectric layer comprises silicon dioxide.

6. The tunable graphene-based infrared reflectance filter of claim 1, wherein the bottom dielectric layer comprises hafnium dioxide, magnesium oxide, lead zirconium titanate, or alumina.

7. The tunable graphene-based infrared reflectance filter of claim 1, wherein the top dielectric layer comprises hafnium dioxide.

8. The tunable graphene-based infrared reflectance filter of claim 1, wherein the top dielectric layer comprises silicon dioxide, magnesium oxide, lead zirconium titanate, or alumina.

9. The tunable graphene-based infrared reflectance filter of claim 1, wherein the nanoantenna comprises a grating having a periodicity comparable to the wavelength of the incident infrared light.

10. The tunable graphene-based infrared reflectance filter of claim 1, wherein the nanoantenna comprises a metal.

11. The tunable graphene-based infrared reflectance filter of claim 1, wherein the nanoantenna comprises a conductive oxide, polymer, or other conductive non-metal.

12. The tunable graphene-based infrared reflectance filter of claim 1, wherein the wavelength of the incident infrared light is between 1 microns and 50 microns.

13. A tunable graphene-based infrared reflectance filter, comprising:
   a conductive substrate;
   a bottom dielectric layer on the substrate;
   an unpatterned graphene layer on the bottom dielectric layer;
   a top dielectric layer on the graphene layer; and
   a nanoantenna layer on the top dielectric layer, wherein the nanoantenna layer is patterned to excite plasmons within the graphene layer; and
   wherein the conductive substrate is adapted to apply a voltage bias to the graphene layer, thereby changing the Fermi level of the graphene and tuning the resonance response of the infrared reflectance filter to incident infrared light incident on the top surface of the nanoantenna layer.

14. The tunable graphene-based infrared reflectance filter of claim 13, wherein the nanoantenna layer comprises a conductive nanoantenna adapted to apply a bias voltage to the graphene layer, thereby providing a dual-gated infrared reflectance filter.

15. The tunable graphene-based infrared reflectance filter of claim 14, wherein the conductive nanoantenna comprises a metal.

16. The tunable graphene-based infrared reflectance filter of claim 14, wherein the conductive nanoantenna comprises a conductive oxide, polymer, or other conductive non-metal.

17. The tunable graphene-based infrared reflectance filter of claim 13, wherein the nanoantenna layer comprises a grating having a periodicity comparable to the wavelength of the incident infrared light.

18. The tunable graphene-based infrared reflectance filter of claim 13, wherein the bottom dielectric layer comprises silicon dioxide.

19. The tunable graphene-based infrared reflectance filter of claim 13, wherein the bottom dielectric layer comprises hafnium dioxide, magnesium oxide, lead zirconium titanate, or alumina.

20. The tunable graphene-based infrared reflectance filter of claim 13, wherein the top dielectric layer comprises hafnium dioxide.

21. The tunable graphene-based infrared reflectance filter of claim 13, wherein the top dielectric layer comprises silicon dioxide, magnesium oxide, lead zirconium titanate, or alumina.

22. The tunable graphene-based infrared reflectance filter of claim 13, wherein the wavelength of the incident infrared light is between 1 microns and 50 microns.

23. The tunable graphene-based infrared reflectance filter of claim 9, wherein the periodicity is subwavelength to the incident infrared light.

24. The tunable graphene-based infrared reflectance filter of claim 17, wherein the periodicity is subwavelength to the incident infrared light.

* * * * *